Nov. 23, 1971    J. W. WEATHERELL ET AL    3,621,616
SURFACE PROCESSING MACHINE
Filed April 3, 1970    7 Sheets-Sheet 6

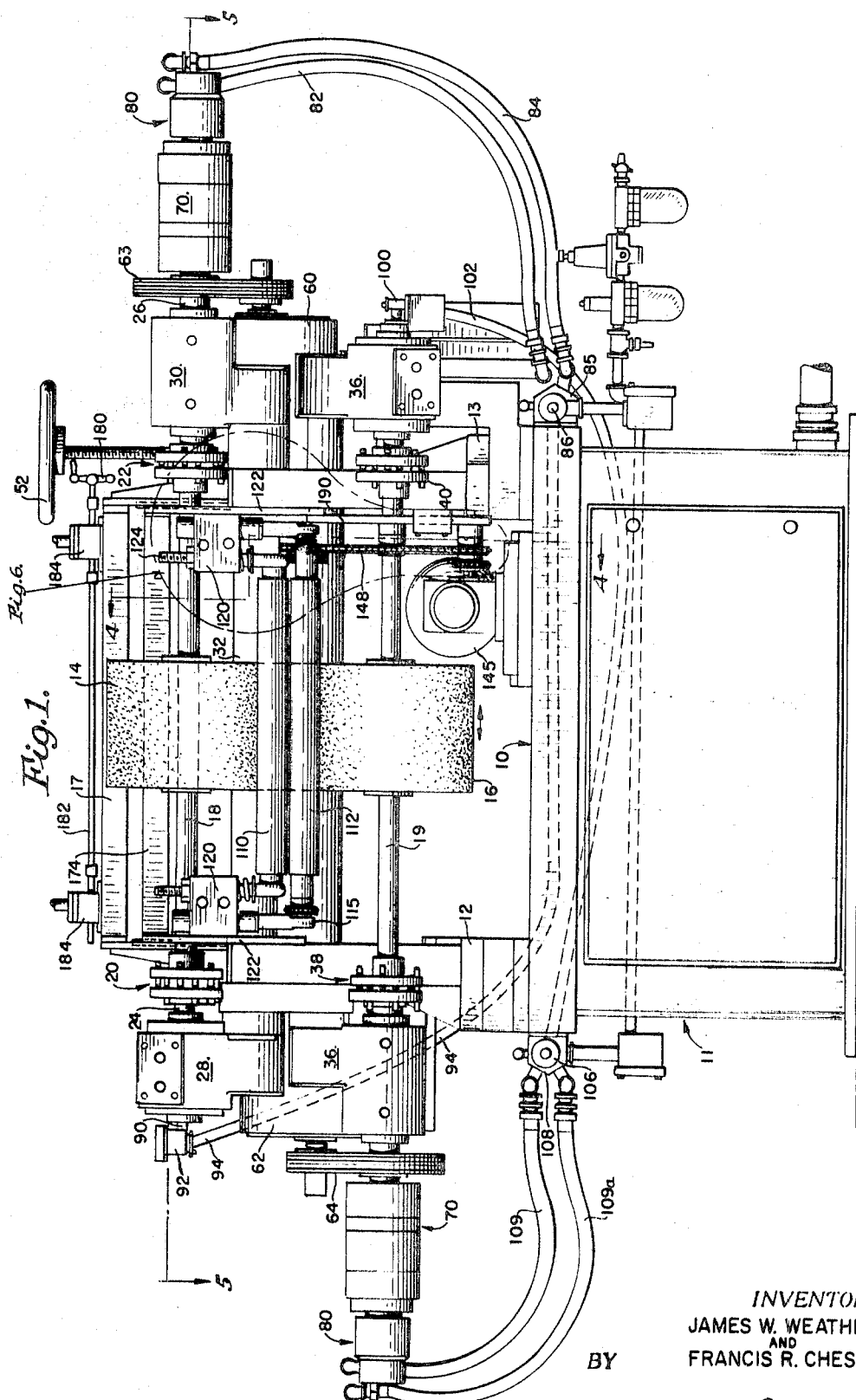

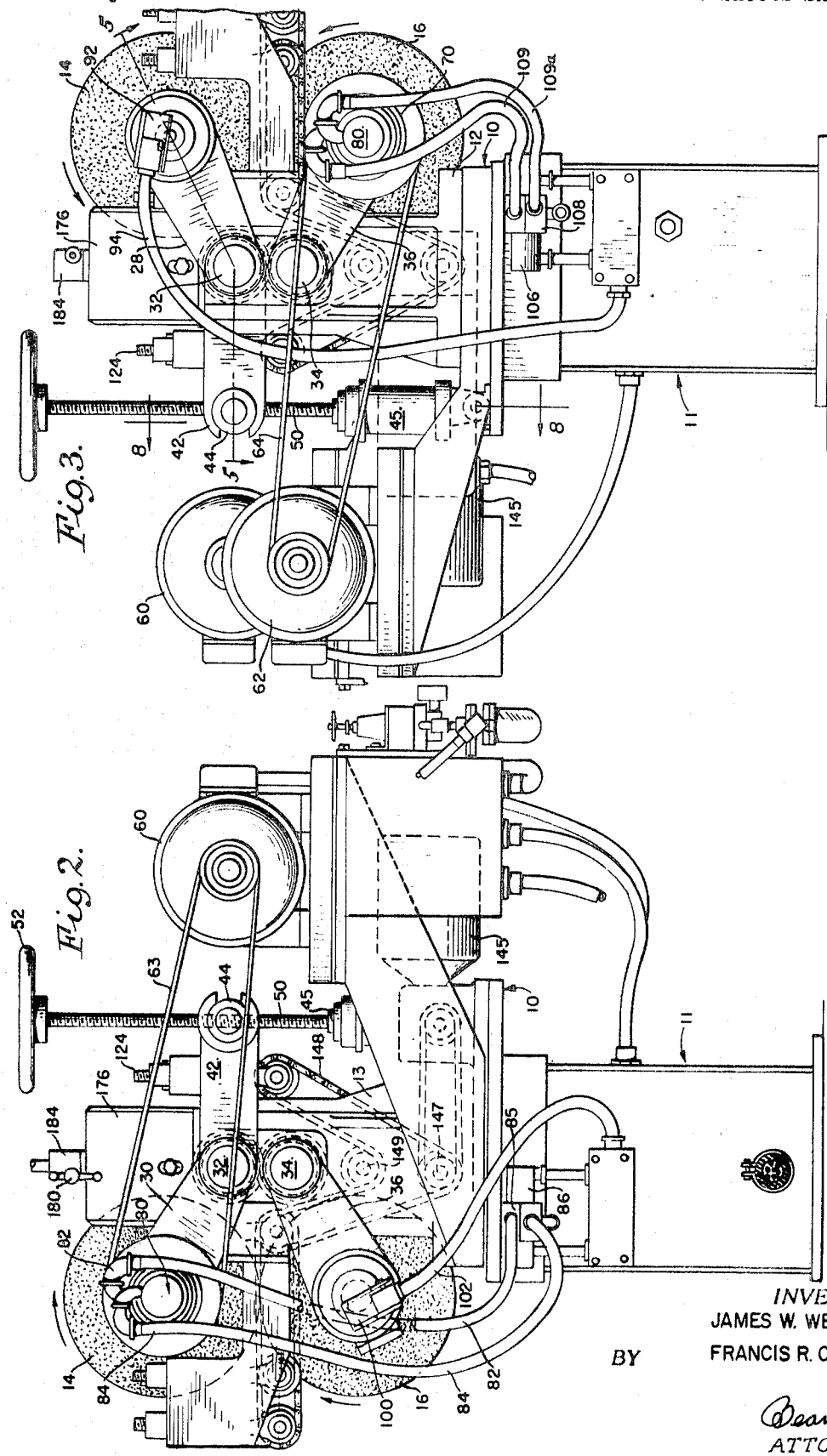

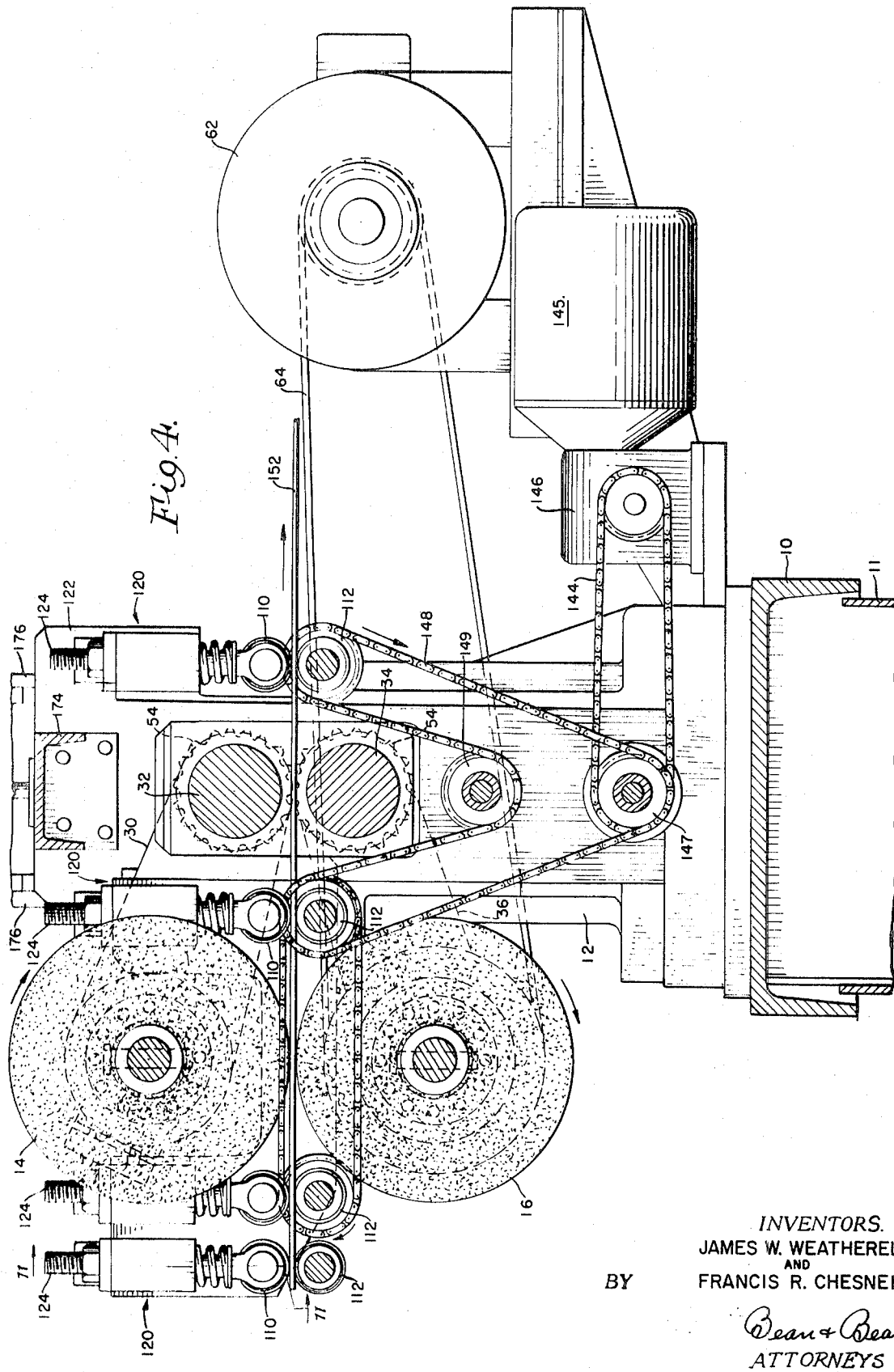

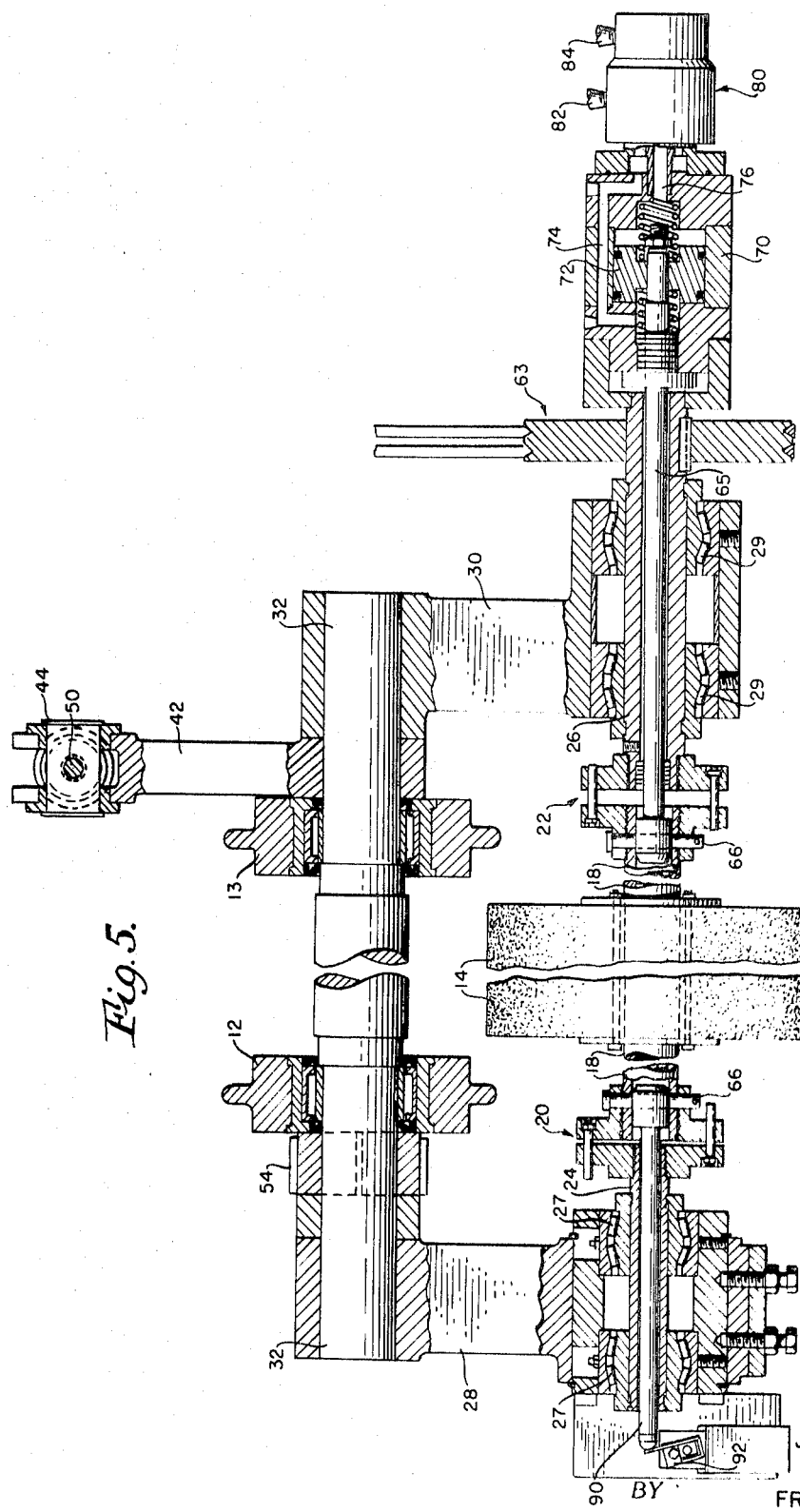

INVENTORS.
JAMES W. WEATHERELL
AND
FRANCIS R. CHESNER
BY Bean & Bean
ATTORNEYS

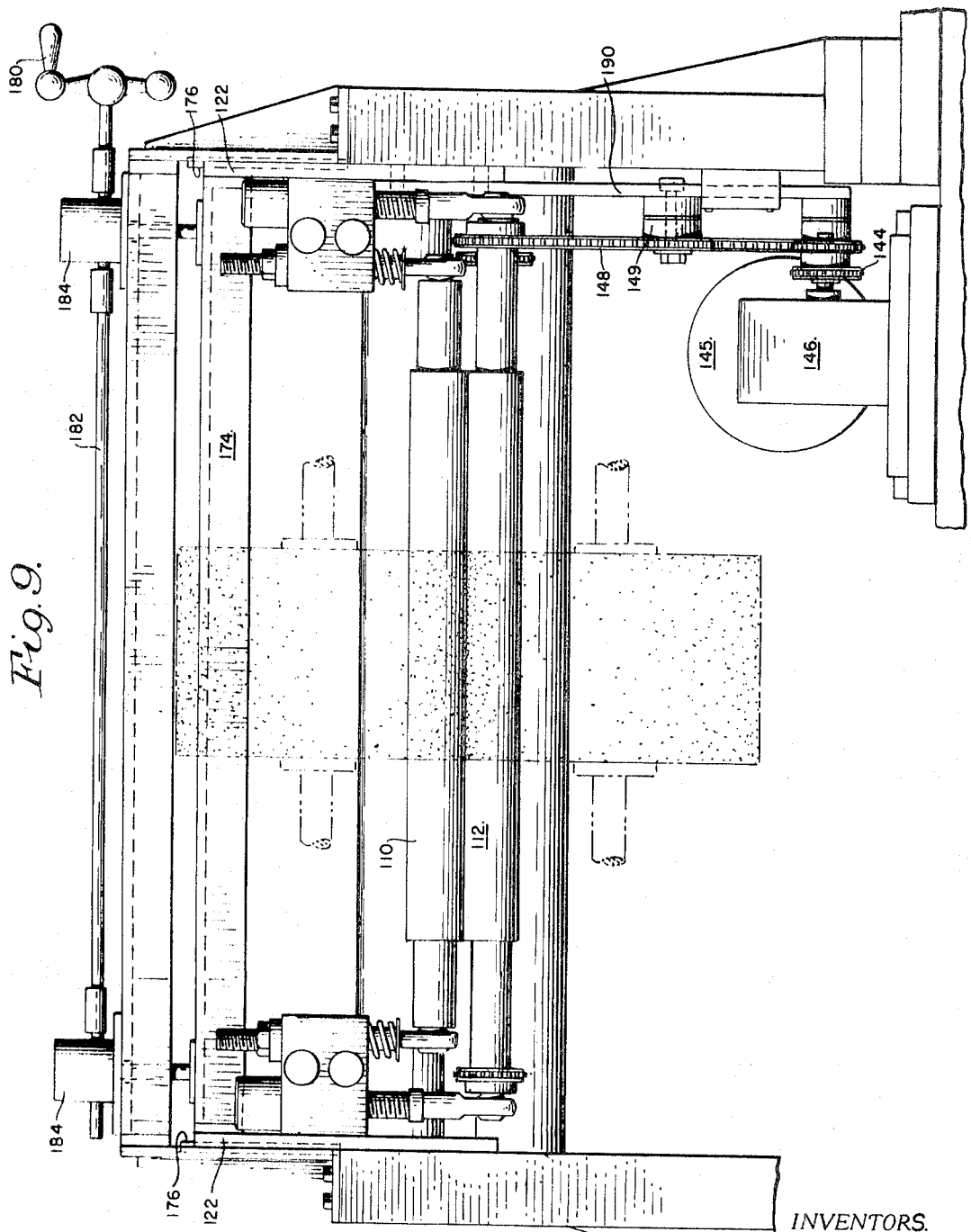

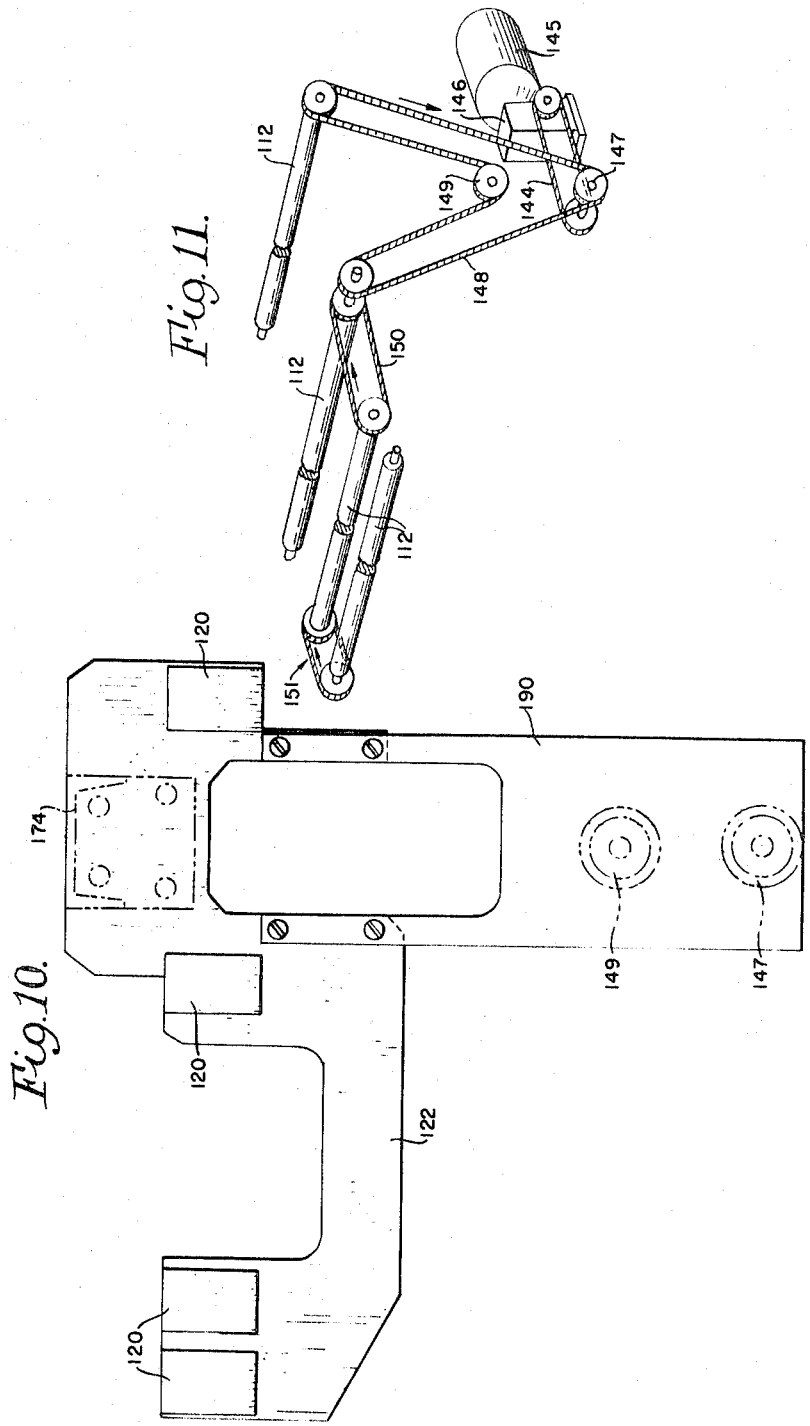

United States Patent Office 3,621,616
Patented Nov. 23, 1971

3,621,616
SURFACE PROCESSING MACHINE
James W. Weatherell and Francis R. Chesner, Olean, N.Y., assignors to Clair Mfg. Co., Inc., Olean, N.Y.
Filed Apr. 3, 1970, Ser. No. 25,432
Int. Cl. B24b 7/00
U.S. Cl. 51—87
10 Claims

ABSTRACT OF THE DISCLOSURE

A machine for simultaneously grinding, abrading, deburring, or otherwise surface-processing both sides of cut-to-length sheet, plate, strip, continuous coil, or other type workpieces; featuring self-dressing oppositely rotating processing rolls, and stirrup plates at opposite sides of the machine which mount an improved workpiece transport "pinch" roller drive system, permitting adjustments thereof so as to prevent "skipping" of the workpiece as it travels through the processing roll gap and thereby ensuring equal and smooth processings of opposite sides of the workpiece throughout its length.

GENERAL DESCRIPTION OF THE INVENTION

The present invention provides enhanced versatility and adjustability to suit a large variety of workpiece processing requirements; and more specifically improved workpiece transport characteristics, avoiding "skipping" of the workpiece through the processing rolls, as well as improved compactness and simplicity and ruggedness of construction; while at the same time featuring a machine which is particularly suited for efficient and speedy operation. Furthermore, the machine incorporates an improved transport adjustment system whereby it may be readily maintained to equally process both sides of workpieces passing through.

Thus, the invention provides an improved machine as aforesaid which includes in combination with a space-adjustable, opposed, double processing roll arrangement, an improved workpiece transport system for feeding workpieces through the machine; and in which the workpiece driving transport rollers are spring-biased and the processing rolls are biased against opposite sides of the workpieces in improved manner by air cylinder means, and are so adjustable as to engage the workpieces under precisely predetermined, preferred, and uniformly existent pressure conditions. Also, the processing rolls are so driven as to apply no drag forces against the workpiece, thereby preventing any tendency of the workpiece to "skip" through the processing rolls and thereby to become irregularly processed along its length. The invention further features a machine as aforesaid embodying an improved quick and positive workpiece processing roll "opening" and "closing" arrangement, and an improved transport "pinch roll" biasing means operating so as to hold the transport pinch rolls against the workpieces in improved manner. Also, the machine features an improved processing roll dressing and re-dressing maintenance arrangement.

There is also provided an improved processing roll mounting and pressure applying and control arrangement therefor, whereby the processing roll control system incorporates improved means for lateral recipocations thereof relative to the workpieces. Thus, the invention provides a machine as aforesaid which is of improved versatility with respect to its adjustability so as to adapt it to finish strips or sheet type workpieces of various thicknesses; while being readily adjustable for either single or multiple pass-throughs of the workpieces. Other features and advantages of the invention will appear from the specification hereinafter.

THE DRAWING

By way of illustration of the invention, a machine embodying the features thereof is illustrated in the accompanying drawing, wherein:

FIG. 1 is a front elevational view of a machine embodying features of the present invention;

FIG. 2 is a right hand end view of the machine of FIG. 1;

FIG. 3 is a left hand end view thereof;

FIG. 4 is an enlarged scale fragmentary sectional view, taken as suggested by line 4—4 of FIG. 1;

FIG. 5 is an enlarged scale fragmentary sectional view, taken as suggested by line 5—5 of FIG. 3;

FIG. 9 is a fragmentary, enlarged scale view of portions of the machine structure as viewed in FIG. 1;

FIG. 10 is an elevational view of a pinch roller and drive system support stirrup plate component of the machine, shown in disassembled relation therefrom;

FIG. 11 is a perspective view of the workpiece transport pinch roll drive system.

DETAILED DESCRIPTION

Figure 8:
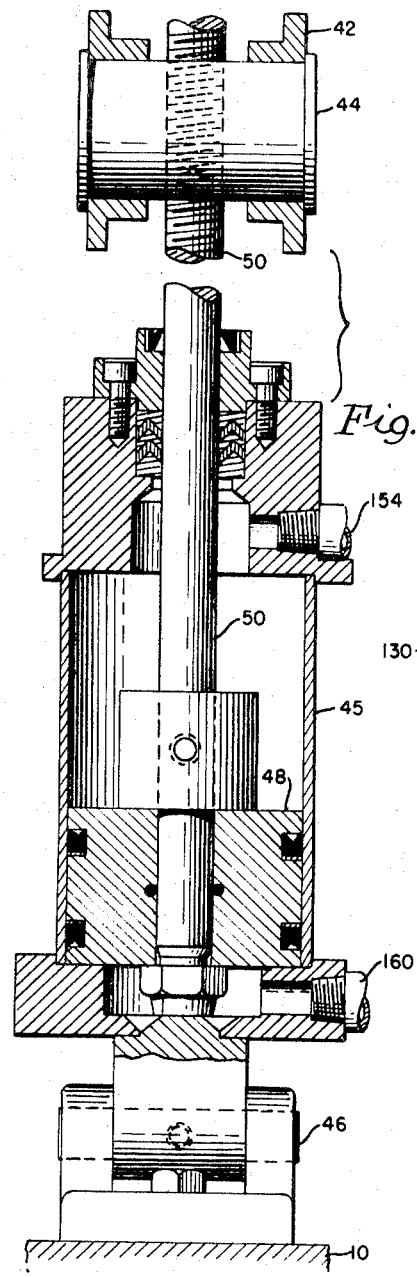
FIG. 8 is a fragmentary sectional view, on enlarged scale, taken as suggested by line 8—8 of FIG. 3.

As illustrated in the drawing herewith, the machine may be constructed to include a base plate 10 supported by a table or frame 11 to a convenient height; plate 10 supporting pedestals 12, 13, which in turn provide support for the workpiece carrying transport rollers and a pair of buffing or polishing or glazing roll or otherwise "processing roll" assemblies 14–16; as well as the appurtenance mechanism for driving and controlling the roll pressures, and for feeding the workpieces therethrough. The pedestals 12, 13, are interconnected at their upper ends by a cross member 17. As shown, the roll 14 is mounted above and parallel to the roll 16. The roll surfaces will of course be formed of any suitable material and treated in any desired manner, according to the character of the work to be done.

As shown herein, the roll 14 is carried upon a shaft 18 while the roll 16 is carried upon a shaft 19. The shaft 18 is connected at its opposite ends by means of flexible couplings 20–22 to hollow stub shafts 24–26, respectively. The shaft 24 is journaled by means of combination radial and end-thrust bearings 27–27 in one end of a rocker arm 28 while the stub shaft 26 is similarly journaled by means of bearings 29–29 in one end of a rocker arm 30 (FIG. 5). The arms 28–30 are keyed to extend in parallel relation from opposite ends of a rocker shaft 32; the shaft 32 being journaled at its opposite ends in the upper ends of the pedestals 12–13.

A second rocker shaft 34 is similarly journaled upon the pedestals 12–13 so as to extend below and parallel to the rocker shaft 32. Rocker arms 36–36 extend in parallel relation from opposite ends of the rocker shaft 34, and carry at their outer ends the lower roll shaft 19 in journaled relation thereon by means of flexible couplings 38–40 and combination bearings as explained hereinabove when describing the mounting arrangement of roll shaft 18. The rocker shaft 32 is fitted with a rearwardly extending crank arm 42 carrying a screw block or nut 44 (FIGS. 2, 3, 5, 8). An air cylinder 45 is pivotally mounted as indicated at 46 at its lower end upon the base plate 10 and slidably mounts therein a piston 48 which is connected to a rod 50 which is screw-threaded at its upper end and engages in screw-threaded relation the block 44. At its upper end the rod 50 carries a hand wheel 52.

The rocker shafts 32–34 are geared together at one end of the machine by means of spur gears 54–54 (FIG. 4). Hence, it will be understood that the cylinder-piston rod unit 45–50 is operable (under control of the machine attendant, as will be explained hereinafter) to force the rocker crank arms to swing the rolls 14–16 so as to "open" and "close" the rolls relative to the workpieces passing therebetween. However, it will be appreciated also that the hand wheel 52 is manually adjustable for regulating the operating distance between the rolls, so as to adapt the machine to different thicknesses and/or shapes of workpieces. Drive motors for the rolls 14–16 are provided as indicated at 60–62, respectively, and are operably coupled thereto as by V-belt and pulley systems as indicated at 63, 64.

As shown in FIGS. 1 and 5, the parts are so dimensioned that the distances between the face plates carried by the roll shafts are shorter than the spaces between the opposed face plates of the couplings 20–22, whereby the processing rolls may be axially reciprocated incidental to rotation thereof. Such reciprocations of the rolls are attained in each case by means of a push-pull rod as shown at 65 (FIG. 5) which extends through the hollow stub shaft 26 and connects at one end by means of a pin 66 to the face plate which drives the roll. At its other end the push-pull rod 65 extends into a cylinder 70 which is carried by and rotates with the hollow stub shaft; the cylinder 70 having disposed therein a piston 72 to which the rod 65 is fixedly connected. The cylinder 70 includes separate compressed air passageways 74, 76 which enter the cylinder through means of a rotary union 80 and connect therethrough with corresponding conduits 82, 84. The pneumatic conduits 82, 84 leading away from the reciprocation control for the upper roll 14 communicate with a solenoid controlled valve as indicated at 85 (FIGS. 1, 2). The valve 85 may be of any four-way standard valve type adapted to deliver air under pressure either to the conduit 82 or the conduit 84, depending upon positional adjustments of the valve armature as by means of a solenoid such as indicated at 86.

A similar control rod 90 (FIG. 5) is disposed to extend through the hollow stub shaft 24, and is connected at one end by means of a pin 66 to the roll spindle 18 so as to reciprocate axially therewith. At its other end the rod 90 is arranged to alternately operate and release an electrical spring-biased switch 92 in accord with reciprocating movements of the rod 90 in consonance with reciprocation of the roll. The switch 92, through a conductor cable system 94 (FIG. 1) alternatively actuates the solenoid 86 controlling the four-way valve 85. Thus, it will be appreciated that reciprocations of the roll 14 in axial directions will be accompanied by equal reciprocations of the switch actuating rod 90; thereby alternately operating the solenoid 86, so as to shift the valve 85 to cause the piston 72 to reciprocate and correspondingly reciprocate the roll 14 in axial directions.

As explained hereinabove, the lower roll 16 is similarly mounted and actuates upon reciprocation thereof a similar solenoid control switch 100 (FIGS. 1, 2) which by means of conductor 102 controls a solenoid 106 which shifts a valve 108, thereby controlling reciprocation of the upper roll 14 through pneumatic conduits 109–109a. Hence, the reciprocation control system functions automatically and without interference with the driving rotations of the rolls 14–16 to cause the latter to reciprocate axially and in synchronization. Roll changes are conveniently effected simply by first removing the pins 66–66 and thereby releasing the flexible couplings.

Figure 6:
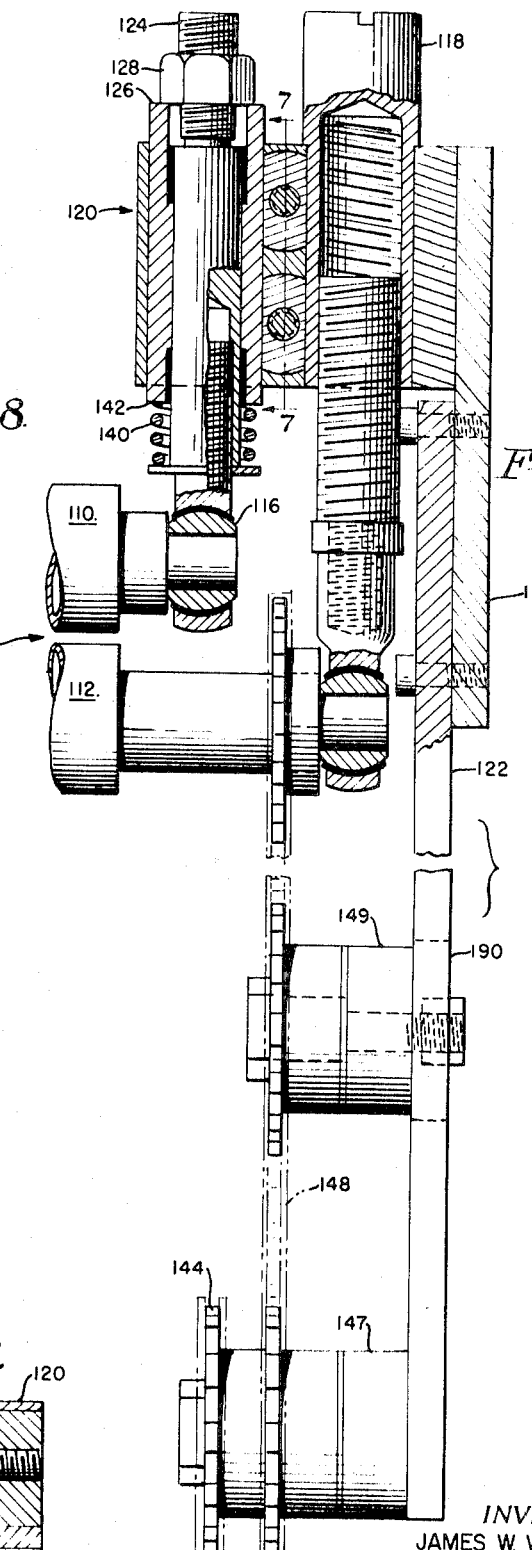
FIG. 6 is an enlarged scale view, with some parts shown in section, of the portion encircled and designated by the numeral 6 of FIG. 1.

The workpiece transport mechanism comprises four sets or units of vertically paired pinch rollers disposed fore and aft of the processing roll gap. As best shown at FIGS. 1, 4, 6, 9, each pair of pinch rollers comprises an upper roll 110 and a lower roll 112; the upper and lower rollers being journaled at their opposite ends in hanger rods 114–115, respectively, by means of spherical bearings 116 as best shown at FIG. 6. The hanger rods at each end of each paired pinch roll unit suspend from a bracket block which is designated generally at 120; the bracket blocks being fixedly mounted upon corresponding saddle plates 122, 122. The hanger rods 115 are fixed by the bracket blocks 120 in vertically adjustable relation therein by means of screw-nut devices as indicated at 118.

Figure 7:
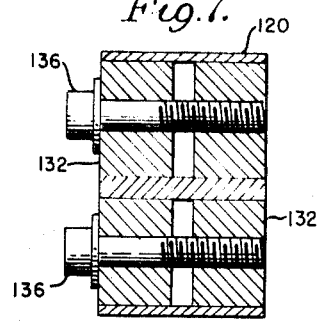
FIG. 7 is a fragmentary sectional view taken as suggested by line 7—7 of FIG. 6.

The upper pinch rolls 110 are carried by their hanger rods 114 so as to be both vertically adjustable and resiliently biased toward their lower rollers by means of devices as illustrated at FIG. 6. Each hanger rod 114 is screw-threaded into the lower end of a cylindrical rod 124 which is vertically slidable within a sleeve 126 fixedly carried by the bracket housing 120. The upper end of each rod 124 is threaded and carries a self-locking nut 128 which is positionally adjusted thereon so as to suitably limit downward sliding motions of the rod so as to maintain the desired workpiece gap between the pinch rolls as indicated at 130. A pair of locking wedge blocks 132–132 (FIGS. 6, 7) are slip-fitted in bored out portions of the bracket housings 120, and are so positioned and arranged that they may be drawn together so as to lock the sleeve 126 relative to the bracket 120. For actuation of the locks 132—132 each unit is provided with a pull screw 136 so as to be operable from externally of the device.

Whereas in some cases it will be preferred to provide for the upper pinch roll 110 to have some degree of freedom for upward retreat (while still maintaining the requisite pressure or "pinch" effect upon the workpiece being transported through the machine), a compression spring 140 is provided as shown at FIG. 6 to operate against a shoulder portion 142 of the rod member, thereby biasing the upper roll against movements away from its preselected gap position relative to the lower pinch roll.

As best illustrated at FIGS. 6, 11, the lower pinch rolls are powered in synchronism by means of a roller chain 144 driven by a motor 145 through a speed reduction gear box 146. The chain 144 drives a double sprocket 147 which in turn drives a chain 148 which trains around the drive sprockets of two of the pinch rollers 112 and an idler sprocket 149. Companion chains 150, 151 interconnect the first driven pinch rollers and the other pinch rollers, whereby all pinch rollers 112 are driven to rotate in unison and in the same direction. Thus, it will be appreciated that the lower pinch rollers 112 will operate to drive a workpiece (as indicated at 152, FIG. 4) through the processing gap between the process rolls 14–16; the upper pinch rolls 110 simply operating as idlers in opposition to the lower pinch rolls while maintaining the requisite presures against the workpiece so as to insure proper transport thereof. This not only insures perfect frictional contact between the workpiece and the transport driving rolls 112 for smooth and uniform transport of the workpiece through the process rolls, but also insures against accidental "scooting" of the workpiece through the process rolls, but also insures against accidental "scooting" of the workpiece through the rolls, such as would produce an imperfectly finished product. Thus it will be appreciated that a batch of workpieces such as indicated at 152 (FIG. 4) may be successively fed into the gap between the pinch rollers whereby they will be driven to pass between the rolls 14–16, either in the manner of a single pass or repeated straight line passes; or, reciprocally back and forth between the process rolls, as may be preferred.

Depending upon the thickness of the workpieces to be processed, the attitude of the arm 42 will first be vertically adjusted by means of the hand wheel 52 to such a position that when compressed air is delivered into the cylinder (as through port 160 (FIG. 8) the piston 48 will be driven upwardly so as to close the process rolls 14–16 against the workpiece under the desired degree of pressure. Thus, although the rolls will be manually adjusted in the first place to suit workpieces of different thicknesses, after such initial adjustments the working pressures between the processing rolls and the workpieces will be determined and maintained by the air pressure within the cylinder 45. The air pressure in the cylinder will of course be maintained at the desired level by a pressure regulator in the supply line. Inasmuch as the working pressure is thus of a resilient nature a uniform pressure will be exerted between the processing rolls and the workpieces at all times.

It will be understood that the pneumatic cylinder 45 may be operator-controlled so that the operator through actuation of a suitable valve may admit compressed air to enter the cylinder 45 through a port 154 (FIG. 8) whereupon the piston 48 will "open" the rolls to facilitate operator adjustment of the roll pressure control system. Thus, after proper adjustment, it is the resilient air pressure force exerted by the piston 48 that operates to maintain the processing rolls in the desired pressured relation against the workpiece as the pinch rolls transport the workpiece relative thereto. Upon completion of a processing operation the operator may actuate the control valve to "open" the rolls; thus avoiding undesirable wearing contacts between the processing rolls and the workpiece.

It will be understood that the motors driving the workpiece transport system and the finishing rolls 14–16 may be controlled in any preferred manner; such as manually or semi-automatically; or, fully automatically in combination with a sequencing control system including the processing roll "opening" and "closing" operating devices.

As best illustrated at FIGS. 1, 6, 9, 10, the workpiece transport pinch rollers 110–112 are carried by struts which are based upon stirrup plates 122—122 extending vertically at opposite sides of the machine and rigidly interconnected by a transversely extending top beam 174. The plates 122—122 are vertically slidable within runways defined by gib plates 176 attached to the machine pedestals, whereby the stirrup plate and cross beam assembly is vertically movable relative to the machine base. Thus, the pinch roll units are all vertically movable in unison, upon vertical shiftings of the support assembly. This is provided for by a manually operable hand wheel 180 controlling a screw shaft 182 which is geared into screw blocks 184—184 at opposite sides of the machine; the screw blocks being thereby operative to raise or lower rods 186—186 connected to and controlling the vertical position of the stirrup plate and cross beam unit relative to the machine frame. Thus, the machine operator may readily make micro adjustments of the elevation of the workpiece path through the processing gap, so as to appropriately center the work relative to the processing rolls.

The pinch roll driving mechanism comprising appropriately arranged roller chain and sprocket devices (FIG. 11) is mounted upon a hang plate 190 (FIGS. 6, 9, 10) which is bolted to one of the stirrup plates to extend vertically therebelow. The plate 190 journals thereon the double sprocket 147 and the idler sprocket 149; the parts being so arranged that the double sprocket 147 is preferably horizontally aligned with the output drive sprocket of the gear box 146 so that the drive chain 144 is free to oscillate about the center of the gear box output sprocket, without interference with micro adjustments of the elevation of the pinch roll drive unit. The motor unit will also be preferably adjustable horizontally on its base, to accommodate excessive vertical adjustment of the pinch roll unit elevation.

It is another particular feature of the machine of the invention that the processing rolls 14, 16, are driven to rotate in opposite directions, whereby their drag forces against opposite sides of the workpiece being processed are balanced out and neutralized. Hence, the workpiece is subjected to no resultant drag forces by way of the processing rolls such as would otherwise tend to cause the workpiece to "skip" as it travels through the processing gap. In prior machines it has been attempted to avoid such skipping tendencies by adjusting the pinch rollers tightly against the workpiece, but with only partially successful results. Also, by virtue of the oppositely running processing roll arrangement the rolls may be operated so as to be effectively self-dressing. Thus, whenever the machine operator becomes aware of an imperfect processing operation due to disfiguration of the processing roll profiles, he simply removes the workpiece and causes the rolls to come into mutually abrasive contact while running, whereupon the rolls will in short order "dress" themselves to new and optimum profiles, without requiring any dismantling or replacements or other more conventional redressing procedures.

We claim:

1. In a processing machine including a base, a pair of laterally spaced uprights fixed to said base, two pairs of bearing blocks carried by arm means extending from said uprights, a pair of work shafts journaled in correspondingly paired of said bearing blocks in vertically spaced parallel relation, a processing roll carried by each of said work shafts whereby said rolls define a processing gap therebetween, said work shafts being axially shiftable within limits while still being rotatable, power means driving said work shafts to rotate, and means procuring axial reciprocating movements of said processing roll shafts, the improvements comprising:

a workpiece support and transport frame unit disposed between said uprights and comprising a pair of vertically extending stirrup plates disposed in parallel relation at opposite sides of said machine and being slidably mounted thereon by slide track means on said uprights, said stirrup plates being interconnected by a crossbar member thereby providing a unitized frame structure which is vertically shiftable relative to said uprights, screw jack means carried by said uprights and engaging said frame unit whereby manual operation of said screw jack means procures micro adjustments of the elevation of said frame unit relative to said uprights, lower pinch rollers journaled at their opposite ends in hangers carried by said stirrup plates in vertically adjustable position thereon, said rollers being disposed to extend parallel to said processing rolls at opposite sides of said processing gap with the upper profiles of said lower pinch rollers tangential to a plane passing through said processing gap, said lower pinch roller support hangers being fixed at vertically adjustable positions relative to said stirrup plates, upper pinch rollers journaled at their opposite ends in hangers carried by said stirrup plates in vertically adjustable position thereon whereby said upper pinch rollers extend in parallel and vertically spaced relation above the corresponding of said lower pinch rollers, thereby defining a workpiece support and transport gap therebetween in directional alignment with said processing gap, elastic spring means resisting upward movements of said upper rollers relative to their support hangers and operating to bias said upper pinch rollers downwardly against a workpiece passing through said transport gap, and power supply-transmission means carried by said frame unit and movable therewith and geared to at least one of said pinch rollers so as to rotate and drive the latter to cause a workpiece to be transported through said processing gap, whereby said frame unit is vertically adjustable relative to said processing gap for optimum processing of both the upper and lower surfaces of a workpiece by said processing rolls when being transported through the machine.

2. A processing machine as set forth in claim 1 wherein the means for procuring axial reciprocations of said processing roll shafts comprises for each of said roll shafts a piston coupled to a push-pull rod which extends into operative connection with its roll shaft, a cylinder enclosing said piston and axially fixed relative to the machine, a valve controlling alternate applications of fluid pressure in said cylinder at opposite ends of said piston, and automatic reciprocation control means actuated by alternative reciprocative movements of said roll shaft so as to actuate its valve, so as to cause the processing rolls to axially reciprocate while in workpiece contacting position.

3. A processing machine as set forth in claim 1 wherein said processing roll shafts are driven to rotate in opposite directions.

4. A processing machine as set forth in claim 1 wherein said arm means supporting said work shaft bearing blocks comprise separate arms which are pivotably mounted upon said uprights and are geared together so as to pivot simultaneously in opposite directions whereby to "open" or "close" the processing gap.

5. A processing machine as set forth in claim 4 wherein said arms are motivated toward "open" and "close" positions by a pneumatic piston-cylinder device.

6. A processing machine as set forth in claim 5 wherein said piston-cylinder device is manually adjustable relative to said arms for regulation of the throw and pressure applying performances of the processing rolls against a workpiece.

7. A processing machine as set forth in claim 1 wherein two pairs of lower and upper pinch roller units are provided at opposite sides of said processing gap.

8. A processing machine as set forth in claim 7 wherein said power supply-transmission means is operably coupled to all of said lower pinch rollers and wherein said upper pinch rollers run as idlers.

9. A processing machine as set forth in claim 8 wherein said power supply means comprises an electric motor fixed to the machine base and said power transmission means comprises a chain and sprocket mechanism carried upon one of said stirrup plates whereby functional distortions of the drive system incidental to micro positional adjustments of the transport frame unit relative to the machine base are avoided.

10. A processing machine as set forth in claim 7 wherein said processing rolls are driven to rotate in opposite directions.

References Cited

UNITED STATES PATENTS

| | | | |
|---|---|---|---|
| 3,127,708 | 4/1964 | Burt | 51—84 |
| 3,134,201 | 5/1964 | Burt | 51—84 |
| 3,166,874 | 1/1965 | Bottcher | 51—87 |
| 3,218,761 | 11/1965 | Bennes | 51—87 |
| 3,307,297 | 3/1967 | Lawson | 51—80 |

OTHELL M. SIMPSON, Primary Examiner